United States Patent [19]
Hicok et al.

[11] Patent Number: 5,511,174
[45] Date of Patent: Apr. 23, 1996

[54] METHOD FOR CONTROLLING THE OPERATION OF A COMPUTER IMPLEMENTED APPARATUS TO SELECTIVELY EXECUTE INSTRUCTIONS OF DIFFERENT BIT LENGTHS

[75] Inventors: Gary D. Hicok, Mesa, Ariz.; Thomas Alexander, Hillsboro, Oreg.; Yong J. Lim; Yongmin Kim, both of Seattle, Wash.

[73] Assignee: VLSI Technology, Inc., San Jose, Calif.

[21] Appl. No.: 286,662

[22] Filed: Aug. 5, 1994

Related U.S. Application Data

[63] Continuation of Ser. No. 40,803, Mar. 31, 1993, abandoned.

[51] Int. Cl.⁶ ..................................................... G06F 12/00
[52] U.S. Cl. .................... 395/375; 395/481; 364/DIG. 1; 364/DIG. 2
[58] Field of Search .................................... 395/375, 425, 395/400

[56] References Cited

U.S. PATENT DOCUMENTS

| | | | |
|---|---|---|---|
| 4,594,659 | 6/1986 | Guenthner et al. | 395/375 |
| 4,847,759 | 7/1989 | Oklobdzija | 395/375 |
| 5,073,891 | 12/1991 | Patel | 371/21.3 |
| 5,109,495 | 4/1992 | Fite et al. | 395/375 |
| 5,153,848 | 10/1992 | Elkind et al. | 364/748 |
| 5,155,816 | 10/1992 | Kohn | 395/375 |
| 5,163,139 | 11/1992 | Haigh et al. | 395/375 |
| 5,241,636 | 8/1993 | Kohn | 395/375 |
| 5,317,701 | 5/1994 | Reininger et al. | 395/375 |
| 5,337,415 | 8/1994 | DeLano et al. | 395/375 |

OTHER PUBLICATIONS

The Approach to Multiple Instruction Execution in the Gmicro/400 Processor by Yoshida et al. IEEE 1991, pp. 185-195.

*Primary Examiner*—Parshotam S. Lall
*Assistant Examiner*—Zarni Maung
*Attorney, Agent, or Firm*—Harry M. Weiss & Assocs.

[57] ABSTRACT

A method for selectively controlling the operation of a computer system so that the computer system is selectively caused to execute instructions of a first predetermined bit length or instructions of a second predetermined bit length. The method comprises the preliminary steps of storing instruction data in a set of EVEN instruction storage locations; storing instruction data in a set of ODD instruction locations; establishing an EVEN execution pointer; and establishing an ODD execution pointer. At a first given time, either the EVEN execution pointer is incremented by a predetermined COUNT or the ODD execution pointer is incremented by the predetermined COUNT; but both pointers are not simultaneously incremented by the COUNT. The method causes an instruction to be executed, which instruction was stored entirely in either an EVEN instruction location or entirely in an ODD instruction location. At a second given time, both the EVEN instruction pointer and the ODD instruction pointer are incremented by the predetermined COUNT, thereby causing an instruction to be executed, which instruction constitutes a combination of instruction data from an EVEN instruction storage location and instruction data from an ODD instruction storage location.

5 Claims, 2 Drawing Sheets

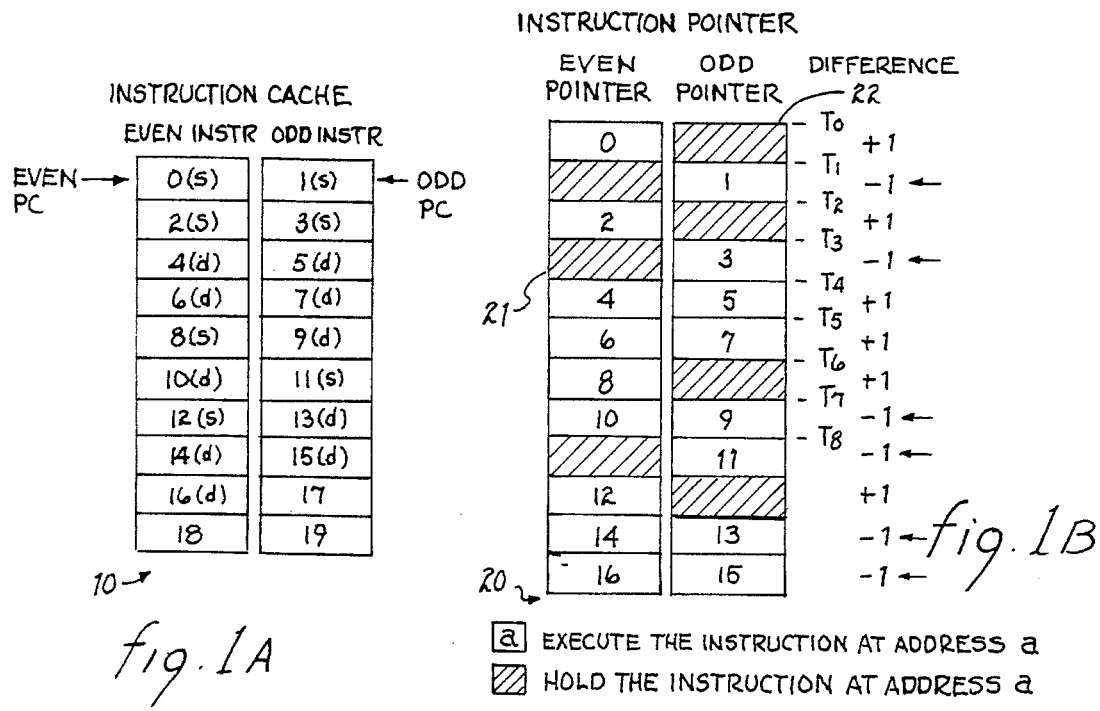
fig. 1A
fig. 1B
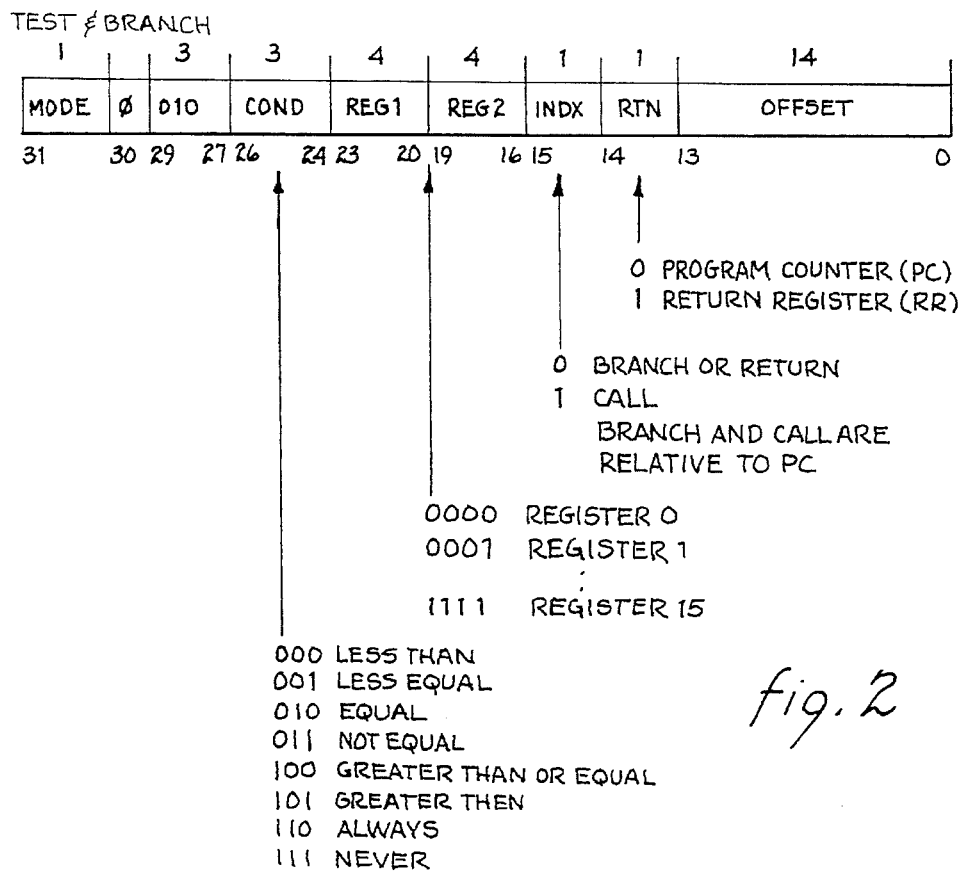
fig. 2

METHOD FOR CONTROLLING THE OPERATION OF A COMPUTER IMPLEMENTED APPARATUS TO SELECTIVELY EXECUTE INSTRUCTIONS OF DIFFERENT BIT LENGTHS

This is a continuation of application Ser. No. 08/040,803, filed on Mar. 31, 1993, now abandoned.

FIELD OF THE INVENTION

The invention relates to computer and microprocessor systems and, more particularly, to a technique for controlling the operation of a computer or microprocessor in a manner that enables selective execution of instructions of different bit lengths.

BACKGROUND OF THE INVENTION

High-performance computer or microprocessor systems, such as a floating point processor (FPP) that might be used, for example, in a graphics chip set, may require the execution of 64-bit instructions. At present, execution of 64-bit instructions may be implemented either by the use of a cache memory (or a memory system) characterized by 64-bit width or by performing multiple fetches of 32-bit instructions for each execution of an instruction.

Parallel execution from a 64-bit wide cache requires that the instruction conform to, or be aligned on, even 64-bit boundaries. This approach can result in wasted cache and memory.

On the other hand, performing double fetches requires an instruction memory that operates at a speed twice that of the execution pipe. As is well known, fast semiconductor memory is expensive.

Accordingly, the subject invention realizes an advance in the state of the art by providing two execution pointers for use with an interleaved instruction cache. The dual pointers are alternately incremented for non-parallel operation and are simultaneously incremented for parallel operation. This inventive technique enables 64 bits of instruction data to be called for execution during each clock cycle, but permits either 32 or 64 bits to be executed depending on the instruction definition.

SUMMARY OF THE INVENTION

The above and other objects, advantages and capabilities are achieved in one aspect of the invention by a method for selectively controlling the operation of a computer system so that the computer system is selectively caused to execute instructions of a first predetermined bit length or instructions of a second predetermined bit length. The method comprises the preliminary steps of storing instruction data in a set of EVEN instruction storage locations; storing instruction data in a set of ODD instruction locations; establishing an EVEN execution pointer; and establishing an ODD execution pointer. At a first given time, either the EVEN execution pointer is incremented by a predetermined COUNT or the ODD execution pointer is incremented by the predetermined COUNT; but both pointers are not simultaneously incremented by the COUNT. It is well known to those skilled in the art that the amount, or the COUNT, that an EVEN or ODD execution pointer moves in order to point to their respective instructions may be established via software that could be executed by a computer-implemented apparatus in order to drive either the EVEN or the ODD execution pointer. The method causes an instruction to be executed, which instruction was stored entirely in either an EVEN instruction location or entirely in an ODD instruction location. At a second given time, both the EVEN instruction pointer and the ODD instruction pointer are incremented by the predetermined COUNT, thereby causing an instruction to be executed, which instruction constitutes a combination of instruction data from an EVEN instruction storage location and instruction data from an ODD instruction storage location.

BRIEF DESCRIPTION OF THE DRAWING

FIG. 1A represents an interleaved instruction cache with ODD and EVEN instruction pointers;

FIG. 1B represents the interleaved instruction cache of FIG. 1A together with hypothetical contents of those pointers over a number of time periods, or clock cycles;

FIG. 2 represents a 32-bit memory instruction data which is to be loaded into the interleaved instruction cache of FIG. 1A.

DESCRIPTION OF A PREFERRED EMBODIMENT

Figure 3:
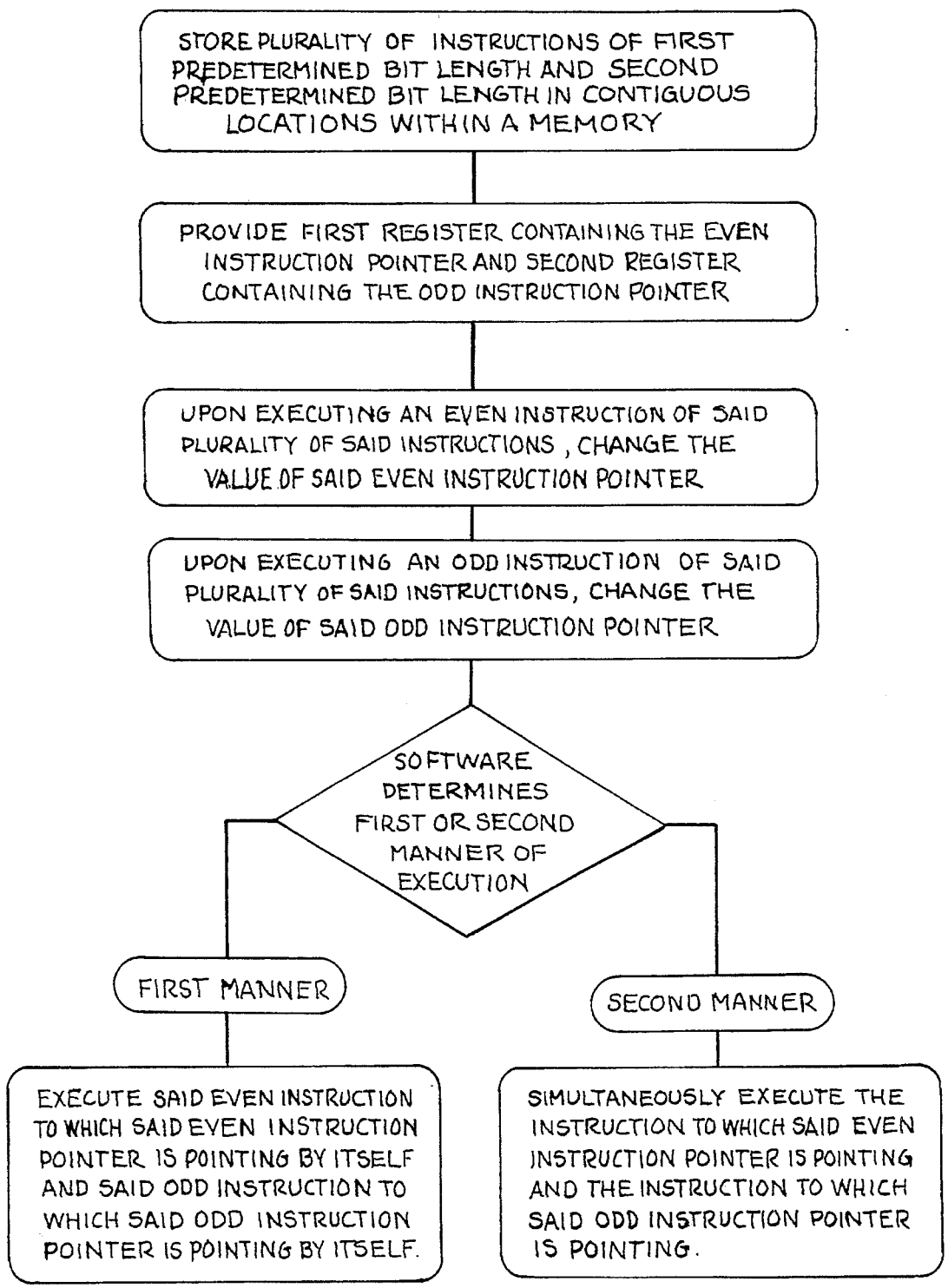
FIG. 3 shows a flow chart depicting a method for controlling the operation of a computer implemented apparatus to selectively execute instructions of different bit lengths.

For a comprehensive understanding of the subject invention, reference is made to the following Description and appended Claims, in conjunction with the above-described Drawing.

As indicated above, the subject invention may be understood in the context of floating point processor (FPP) for a high performance graphics chip set. Associated with the FPP, and depicted in FIG. 1A, is a 32-bit wide, interleaved instruction cache system 10. The instruction cache includes a plurality of EVEN instruction locations, labeled in FIG. 1A as 0, 2, 4, ... The instruction cache also includes a plurality of ODD instruction locations, labeled in FIG. 1A as 1, 3, 5, ... The invention also includes an instruction pointer 20 that includes an EVEN instruction pointer 21 and an ODD instruction pointer 22.

As is well understood by practitioners having ordinary skill in the art, the instruction cache 10 will be loaded with instruction data, as shown in FIG. 2, appropriate to the program to be executed. For the purposes of illustration, assume that the program to be executed requires that the instructions in locations 0, 1, 2, 3, 8, 11, and 12 are to be executed individually, that is, in a non-parallel mode, hence the labels in FIG. 1A, 0(*s*), 1(*s*), 2(*s*), 3(*s*), 8(*s*), 11(*s*) and 12(*s*), and that the remaining instructions are to be executed in pairs, that is, in a parallel mode. Specifically, execution is to occur according to combined instructions in (4 and 5), (6 and 7), (9 and 10), (13 and 14), and (15 and 16), hence the labels 4(*d*), 5(*d*), 6(*d*), 7(*d*), and so forth.

According to the invention, selection of operation in the parallel, or alternatively, the non-parallel instruction execution mode is effected by the appropriate incrementing, by a COUNT-2, of the ODD instruction pointer and the EVEN instruction pointer. The ODD and the EVEN instruction pointers are incremented individually, and reciprocally, to effect nonparallel instruction execution. Conversely, the pointers are incremented simultaneously to effect parallel execution. FIG. 1B illustrates the manner in which the above result is obtained.

At time $T_0$, the EVEN pointer contains the value 0, and the ODD pointer contains the value 1. Accordingly, the Difference (equal to the value of the ODD pointer minus the value of the EVEN pointer) is +1. At time $T_1$, the EVEN pointer is incremented by the COUNT, that is, by 2, so that the Difference at that time goes from +1 to −1. Accordingly, the instruction at instruction location 0 is executed in a non-parallel mode, and the instruction in location 1 is held. At $T_2$, the ODD pointer is reciprocally incremented individually by the COUNT, so that the Difference goes from −1 to +1. Accordingly, the instruction at location 1 is executed in a non-parallel mode, and the instruction at location 2 is held. Reciprocal increments are effected at $T_3$, and $T_4$, and the instructions at location 2 and location 3 are consecutively executed in a non-parallel mode.

However at $T_5$, the EVEN pointer and the ODD pointer are simultaneously incremented, and the Difference is held at +1. As a result, the instructions at locations 4 and 5 are combined and executed in a parallel mode. Similarly, at $T_6$, the pointers are simultaneously incremented by the COUNT, the Difference remains +1, and the instructions at locations 6 and 7 are combined and executed in a parallel mode. (Execution of the remaining instructions in either parallel or non-parallel mode is evident from FIG. 1B and will not be narrated here.)

Referring to FIG. 3, a flow chart depicting a method for controlling the operation of the cache system 10 is shown. The operation of the cache system has been described above and will not be repeated here.

The above-described technique for selecting between parallel or non-parallel instruction execution is readily implemented through conventional software programming that is well within the grasp of practitioners having ordinary skill in the art. Accordingly, although a preferred embodiment of the invention has been described, it will be apparent to those having ordinary skill in the art that the subject invention contemplates various modifications, without departure from the scope of the appended claims.

We claim:

1. A method for selectively controlling the operation of a computer-implemented apparatus including means within said computer-implemented apparatus such that a software program when executed by a computer enables said computer to selectively execute instructions of a first predetermined bit length and instructions of a second predetermined bit length comprising the steps of:

storing a plurality of said instructions of at least one of said first predetermined bit length and said second predetermined bit length in contiguous locations within a memory;

providing first register means containing an even instruction execution pointer having a value pointing at a first one of said plurality of said instructions;

providing second register means containing an odd instruction execution pointer at one of said plurality of said instructions that is adjacent to said first one of said plurality of said instructions;

said computer executing said first one of said plurality of said instructions and changing the value of said even instruction execution pointer by some amount in order to point said even instruction execution pointer to another one of said plurality of said instructions and executing said one instruction adjacent to said first one of said plurality of said instructions and changing the value of said odd instruction execution pointer by said amount in order to point said odd instruction execution pointer to yet another one of said plurality of said instructions, said changing the value of said even instruction execution pointer alternating with said changing the value of said odd instruction execution pointer in order to cause said computer to execute each of said plurality of said instructions in at least one of a first and a second manner;

said first manner of executing occurring when one of said even and said odd instruction execution pointers point to an instruction having a portion therein that signals said first manner of execution to said computer, said first manner of execution causing said computer to execute said instruction by itself, said instruction having said first predetermined bit length; and said second manner of execution occurring when one of said even and said odd instruction execution pointers point to an instruction having a portion therein that signals said second manner of execution to said computer, said second manner of execution causing said computer to simultaneously execute the instruction to which said even instruction execution pointer is pointing and the instruction to which said odd instruction execution pointer is pointing, said simultaneous execution of instructions corresponding to said execution of said instruction of said second predetermined bit length.

2. The method of claim 1 wherein said amount of changing the value of said even and said odd instruction execution pointers is set to a value of two (2) in order to cause said even instruction execution pointer to change value from a current instruction of said even instruction execution pointer to an instruction located two instructions away from said current instruction of said even instruction execution pointer and to cause said odd instruction execution pointer to move from a current instruction of said odd instruction execution pointer to another instruction located two instructions away from said current instruction of said odd instruction execution pointer.

3. The method of claim 1 wherein said first predetermined bit length is equal to said second predetermined bit length.

4. The method of claim 3 wherein said amount of changing said even and said odd instruction execution pointers is set to a value of two (2) in order to cause said even instruction execution pointer to change value from a current instruction of said even instruction execution pointer to an instruction located two instructions away from said current instruction of said even instruction execution pointer and to cause said odd instruction execution pointer to move from a current instruction of said odd instruction execution pointer to another instruction located two instructions away from said current instruction of said odd pointer.

5. The method of claim 2 wherein said first predetermined bit length is equal to said second predetermined bit length.

* * * * *